US012638569B2

(12) United States Patent
Lee et al.

(10) Patent No.: US 12,638,569 B2
(45) Date of Patent: May 26, 2026

(54) SWITCHING ANTENNA FOR VEHICULAR UWB COMMUNICATION

(71) Applicants: HYUNDAI MOBIS CO., LTD., Seoul (KR); UIF (University Industry Foundation), Yonsei University, Seoul (KR)

(72) Inventors: Yoon Jin Lee, Yongin-si (KR); Young Joong Yoon, Seoul (KR); Seung Gook Cha, Seoul (KR)

(73) Assignees: Hyundai Mobis Co., Ltd., Seoul (KR); UIF (University Industry Foundation), Yonsei University, Seoul (KR)

( * ) Notice: Subject to any disclaimer, the term of this patent is extended or adjusted under 35 U.S.C. 154(b) by 275 days.

(21) Appl. No.: 18/241,448

(22) Filed: Sep. 1, 2023

(65) Prior Publication Data

US 2024/0079769 A1      Mar. 7, 2024

(30) Foreign Application Priority Data

Sep. 2, 2022    (KR) ........................ 10-2022-0111349

(51) Int. Cl.
| | |
|---|---|
| *G01S 11/02* | (2010.01) |
| *H01Q 5/25* | (2015.01) |
| *H01Q 1/38* | (2006.01) |
| *H01Q 1/48* | (2006.01) |
| *H01Q 1/50* | (2006.01) |

(52) U.S. Cl.
CPC ................ *G01S 11/02* (2013.01); *H01Q 5/25* (2015.01); *H01Q 1/38* (2013.01); *H01Q 1/48* (2013.01); *H01Q 1/50* (2013.01)

(58) Field of Classification Search
CPC .. H01Q 1/50; H01Q 1/38; H01Q 1/48; H01Q 5/25; G01S 11/02
See application file for complete search history.

(56) References Cited

U.S. PATENT DOCUMENTS

| | | | | |
|---|---|---|---|---|
| 2007/0120741 A1* | 5/2007 | Tseng | ...................... | H01Q 9/40 |
| | | | | 343/700 MS |
| 2020/0059010 A1* | 2/2020 | Yang | ........................ | H01Q 1/48 |
| 2022/0190489 A1* | 6/2022 | Yong | ...................... | H01Q 1/325 |

FOREIGN PATENT DOCUMENTS

| | | | | | |
|---|---|---|---|---|---|
| CN | 109411886 A | * | 3/2019 | ............... | H01Q 1/38 |
| KR | 10-2021-0039941 A | | 4/2021 | | |
| WO | WO-2022074187 A1 | * | 4/2022 | ........... | H04B 1/3822 |

OTHER PUBLICATIONS

Du, Ke-Lin and Swamy, M. N. S., Wireless Communication Systems—From RF Subsystems to 4G Enabling Technologies Chapter 10 Antennas, Cambridge University Press., 2010 (Year: 2010).*

* cited by examiner

Primary Examiner — Jack W Keith
Assistant Examiner — John Bishoy Sam Abraham
(74) Attorney, Agent, or Firm — Morgan, Lewis & Bockius LLP

(57) ABSTRACT

Proposed is a switching antenna for vehicular UWB communication, the switching antenna including a substrate, a directional radiation unit formed on the substrate and configured to provide a directional radiation signal, a non-directional radiation unit formed on the substrate and configured to provide a non-directional radiation signal, and a signal providing unit formed on the substrate and configured to provide an on or off signal to either the directional radiation unit or the non-directional radiation unit.

19 Claims, 7 Drawing Sheets

1

SWITCHING ANTENNA FOR VEHICULAR UWB COMMUNICATION

CROSS-REFERENCE TO RELATED APPLICATION

This application claims priority from and the benefit of Korean Patent Application No. 10-2022-0111349, filed on Sep. 2, 2022, which is hereby incorporated by reference for all purposes as if set forth herein.

BACKGROUND

Field

Exemplary embodiments of the present disclosure relate to a switching antenna for vehicular UWB communication and, more particularly, to a switching antenna for vehicular UWB communication, the switching antenna being capable of performing location positioning or detecting an occupant sitting on a rear seat through a signal that is selectively radiated by a directional antenna or a non-directional antenna.

Discussion of the Background

Typically, ultra-wideband (UWB) antennas refer to short-distance wireless communication antennas that are capable of transmitting and receiving data by making wireless connections to peripheral devices in limited spaces, such as offices, houses, and vehicles.

The UWB antennas are short-distance wireless communication devices that are capable of performing high-speed communication in a frequency band much broader than a frequency band available for typical antenna devices, but with less energy. It is possible that the UWB antennas transmit data at up to several hundreds of megabits per second (Mbps) to several gigabits per second (Gbps) within a radius of 10 m.

In order to prevent interference with other communication systems, the UWB antennas transmit signals by distributing the energy of the signal over a frequency band spanning several gigahertz (GHz). The UWB antennas are capable of performing communication regardless of frequencies without causing any interference with signals in other narrow bands. The UWB antennas are robust to noise, have a high data transmission rate, and consume less electric power.

Antennas of UWB modules used in vehicles for location positioning are non-directional, while antennas for UWB modules performing a UWB radar function of detecting an occupant sitting on a rear seat are directional.

However, current non-directional and directional antennas have different characteristics. As a result, the problem arises that antennas for two UWB modules need to be manufactured separately for their respective uses. Therefore, it is necessary to find a solution to this problem.

The related art of the present disclosure is disclosed in Korean Patent No. 2021-0039941 (published on Apr. 21, 2021 and entitled "Non-Directional Ultra-Wide band Antenna Device").

SUMMARY

Various embodiments, which are contrived to find a solution to the above-mentioned problem, are directed to a switching antenna for vehicular UWB communication, the switching antenna being capable of performing location positioning or detecting an occupant sitting on a rear seat through a signal that is selectively radiated by a directional antenna or a non-directional antenna.

In an embodiment, a switching antenna for vehicular UWB communication according to the present disclosure includes: a substrate; a directional radiation unit formed on the substrate and configured to provide a directional radiation signal; a non-directional radiation unit formed on the substrate and configured to provide a non-directional radiation signal; and a signal providing unit formed on the substrate and configured to provide an on or off signal to either the directional radiation unit or the non-directional radiation unit.

In an embodiment, the substrate may include: a substrate circuit unit into which a circuit is built; and a substrate antenna unit in which the directional radiation unit, the non-directional radiation unit, and the signal providing unit are formed.

In an embodiment, the directional radiation unit may be formed on an upper surface of the substrate antenna unit.

In an embodiment, the directional radiation units in one pair may have a shape of a rectangle, and may be disposed in an upward-downward direction.

In an embodiment, the non-directional radiation unit may be formed on the bottom surface of the substrate antenna unit.

In an embodiment, the directional radiation unit may be disposed to the left side of the substrate antenna unit, and the non-directional radiation unit may be disposed to the right side of the substrate antenna unit to prevent signal interference with each other.

In an embodiment, the signal providing unit may be embedded in the substrate antenna unit and may be connected to the substrate circuit unit to supply electric power.

In an embodiment, the substrate may include: a first substrate on which the directional radiation unit is formed; a second substrate disposed under the first substrate and forming a space; a third substrate disposed under the second substrate and forming a grounding surface; and a fourth substrate disposed under the third substrate and on which the non-directional radiation unit is formed.

In an embodiment, the first substrate may include: a first substrate circuit unit on which a circuit is formed; and a first substrate antenna unit connected to the first substrate circuit unit and on which the directional radiation unit is formed.

In an embodiment, the third substrate may include: a third substrate circuit unit stacked on top of the second substrate; and a third substrate antenna unit connected to the third substrate circuit unit and serving as a grounding surface.

In an embodiment, the third substrate antenna unit may include: a third plate directionality unit, which is disposed to face the directional radiation unit and forms a third signal hole for providing a signal to the directional radiation unit; and a third plate non-directionality unit, which is connected to the third plate directionality unit and induces omni-directional radiation of the non-directional radiation unit.

In an embodiment, the third signal holes in one pair may be formed in a manner that extends over a distance in the leftward-rightward directions, and a pair thereof may be disposed to be vertically spaced apart from each other for signal transmission in the pair of directional radiation units.

In an embodiment, the third plate non-directionality unit may include: a first ground unit extending laterally from an upper end of the third plate directionality unit; a second ground unit protruding laterally from a lower end of the third plate directionality unit and extending upward; and a third ground unit protruding upward from an upper right end of the third substrate circuit unit.

In an embodiment, the non-directional radiation unit may include: a radiation feeding unit formed on the fourth substrate and connected to the signal providing unit; and a radiation antenna unit connected to the radiation feeding unit and capable of omni-directional radiation when power is applied.

In an embodiment, the radiation feeding unit may include: a first feeding unit connected to the signal providing unit; a second feeding unit extending upward from the first feeding unit; and a third feeding unit extending from an upper end of the second feeding unit in the rightward direction.

In an embodiment, the radiation antenna unit may include: a radial curved portion connected to the radiation feeding unit and forming a curved surface; a radial extension portion extending from an end of the radial curved portion; and a radial connection portion connecting the radial extension portion.

In an embodiment, a central portion of the radial curved portion may be connected to the radiation feeding unit.

In an embodiment, the signal providing unit may include: a directional signal providing unit formed on the substrate and configured to provide a wireless signal to the directional radiation unit; and a non-directional signal providing unit formed on the substrate and connected to the non-directional radiation unit.

In an embodiment, the directional signal providing unit may include: a first directional signal unit formed on the substrate; and a second directional signal unit connected to the first directional signal unit, disposed to face the directional radiation unit, and providing an operation signal of the directional radiation unit as power is applied.

In an embodiment, the second directional signal unit may include: a first signal unit connected to the first directional signal unit; a second signal unit extending from the first signal unit; a third signal unit disposed above the second signal unit; and a fourth signal unit connecting the second signal unit and the third signal unit, wherein the second signal unit and the third signal unit are disposed to face the pair of directional radiation units, respectively.

In the switching antenna for vehicular UWB communication according to the present disclosure, the directional radiation unit is formed on the upper surface of the substrate, the non-directional radiation unit is formed on the rear surface of the substrate, and the directional radiation unit may provide a directional radiation signal or the non-directional radiation unit may provide a non-directional radiation signal by the signal providing unit.

4

Figure 7:
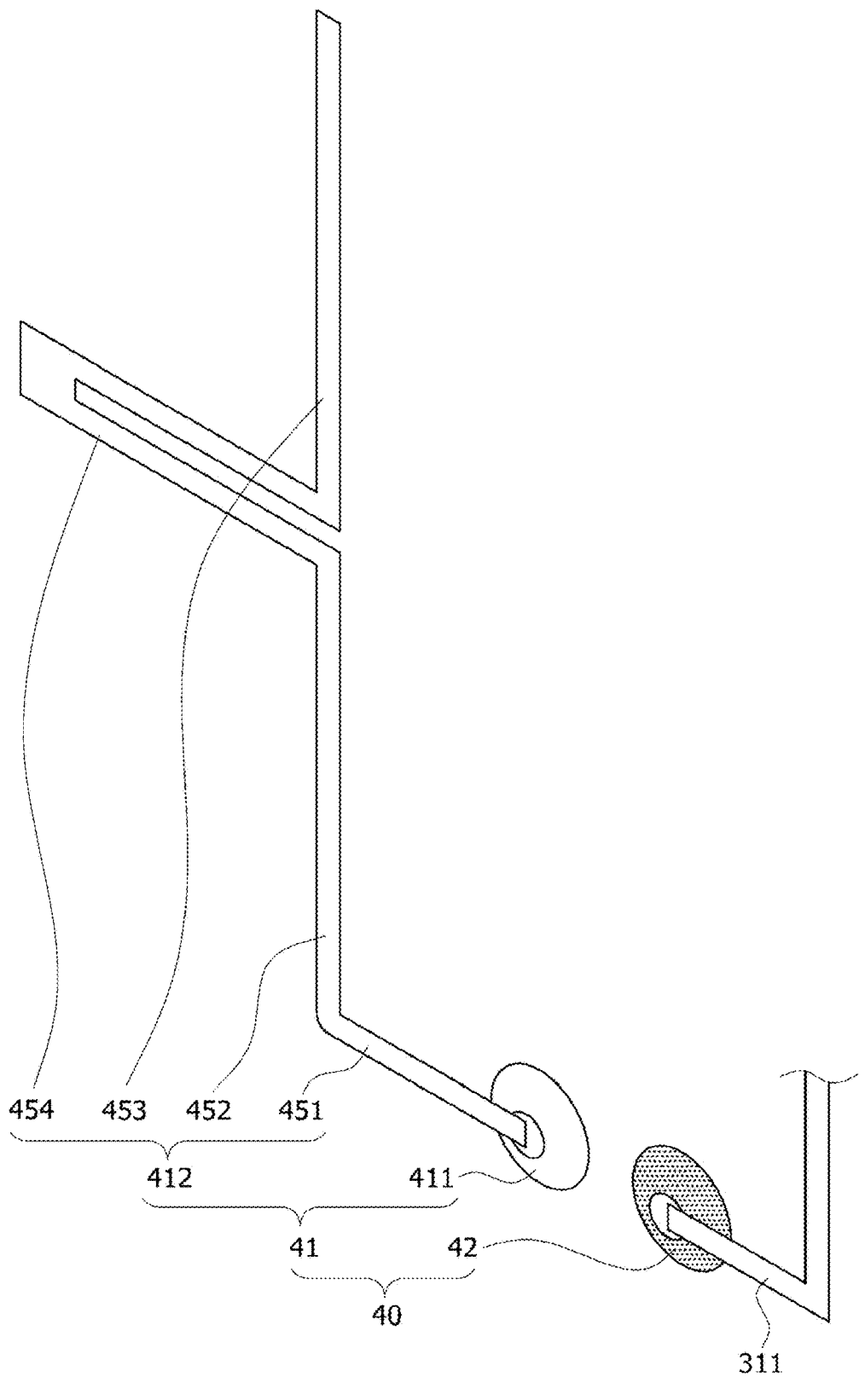

FIG. 7 is a view schematically illustrating a signal providing unit according to an embodiment of the present disclosure.

DETAILED DESCRIPTION OF THE ILLUSTRATED EMBODIMENTS

Hereinafter, an embodiment of a switching antenna for vehicular UWB communication according to the present disclosure will be described with reference to the accompanying drawings. For clarity and convenience in description, thicknesses of lines, sizes of constituent elements, and the like may be illustrated in an exaggerated manner in the drawings. In addition, terms described below are defined by considering functions according to the present disclosure and may vary according to the intention of a user or a manager or according to the common practices in the art. Therefore, definitions of these terms should be defined in light of details disclosed throughout the present specification.

Figure 1:
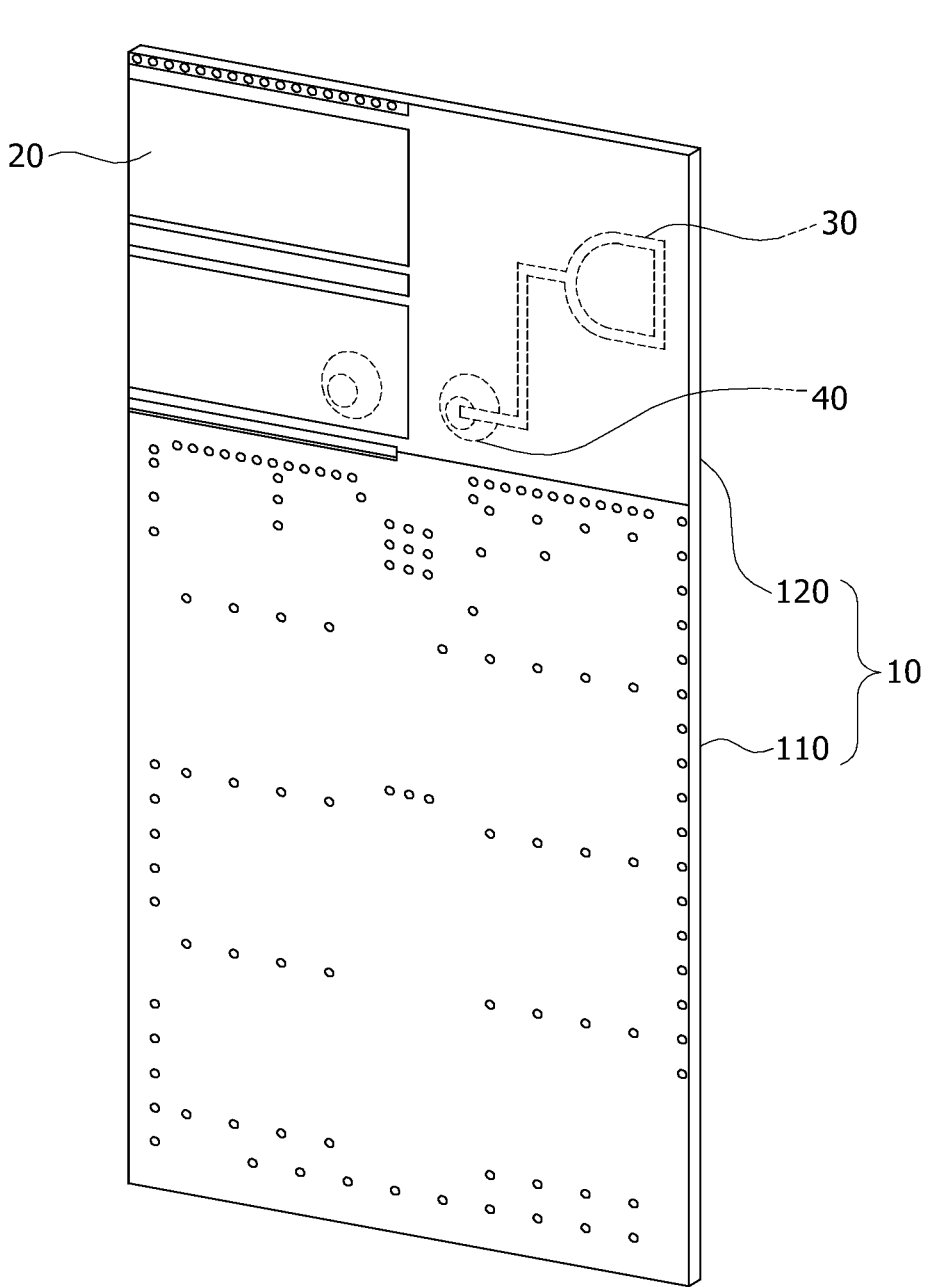
FIG. 1 is a view schematically illustrating a switching antenna for vehicular UWB communication according to an embodiment of the present disclosure.

FIG. 1 is a view schematically illustrating a switching antenna for vehicular UWB communication according to an embodiment of the present disclosure. Referring to FIG. 1, a switching antenna for vehicular UWB communication 1 according to an embodiment of the present disclosure includes a substrate 10, a directional radiation unit 20, a non-directional radiation unit 30, and a signal providing unit 40.

The substrate 10 can be divided into a substrate circuit unit 110 made of resin material and in which a circuit is embedded, and a substrate antenna unit 120 in which an antenna is formed. That is, the directional radiation unit 20, the non-directional radiation unit 30, and the signal providing unit 40 may be formed on the substrate antenna unit 120. A plurality of such substrates 10 may form layers and may be bonded to each other or may be molded through a mold.

The directional radiation unit 20 is formed on the substrate 10 and may provide a directional radiation signal. For example, the directional radiation unit 20 may be formed on an upper surface of the substrate antenna unit 120. The directional radiation unit 20 has a shape of a rectangle, and a pair may be formed vertically.

The non-directional radiation unit 30 is formed on the substrate 10 and may provide a non-directional radiation signal. For example, the non-directional radiation unit 30 may be formed on a bottom surface of the substrate antenna unit 120. In order to prevent the non-directional signal radiated from the non-directional radiation unit 30 from interfering, the directional radiation unit 20 may be disposed on the left side of the substrate antenna 120, and the non-directional radiation unit 30 may be formed on the right side of the substrate antenna unit 120.

The signal providing unit 40 is formed on the substrate 10 and may provide an on or off signal to either the directional radiation unit 20 or the non-directional radiation unit 30. For example, the signal providing unit 40 may be embedded in the substrate antenna unit 120 and connected to a substrate circuit unit 110 to supply electric power. The signal providing unit 40 can perform antenna switching using a single pole double throw (SPDP) element embedded in the substrate 10.

Figure 2:
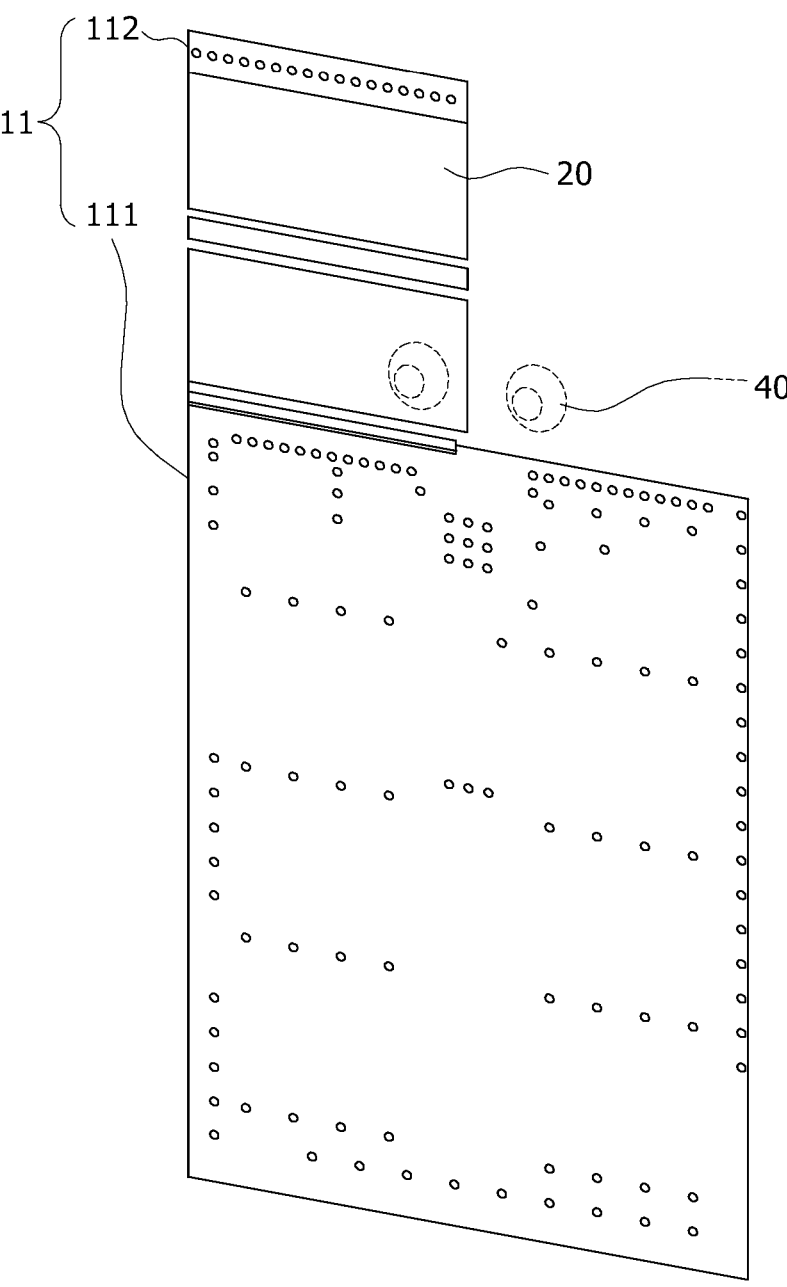
FIG. 2 is a view schematically illustrating a first substrate according to an embodiment of the present disclosure.
Figure 3:
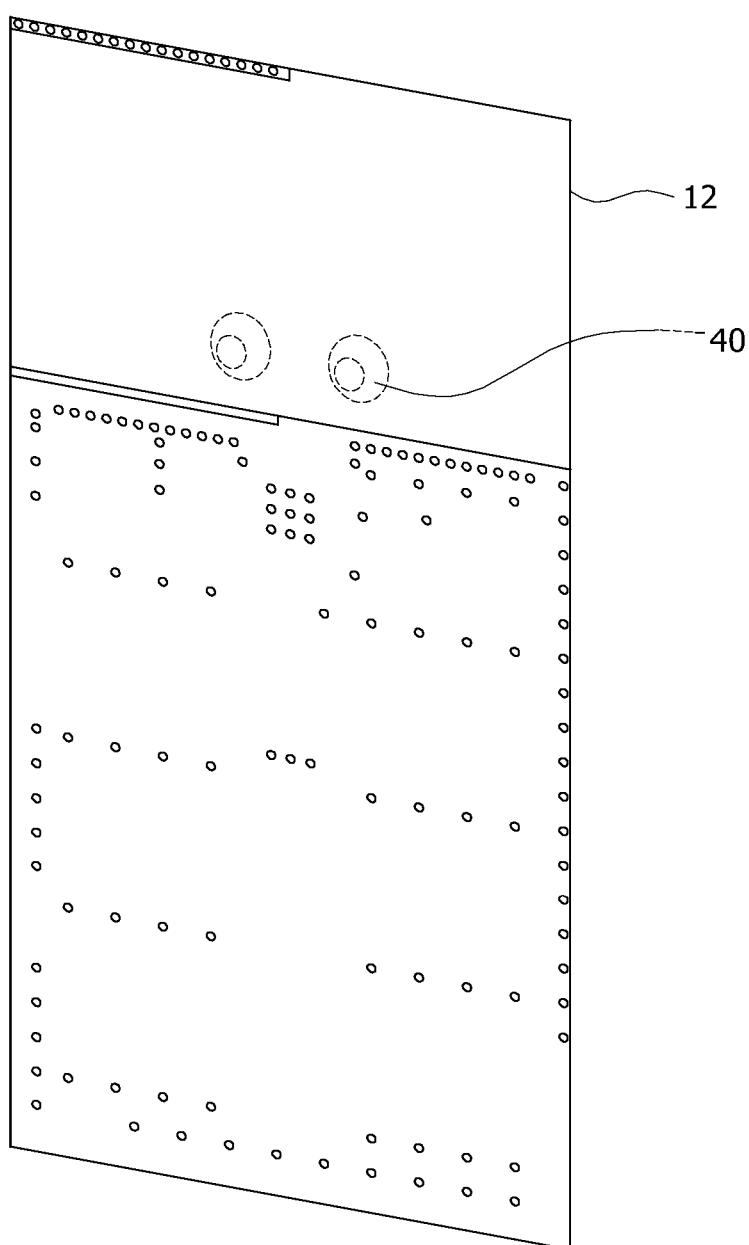
FIG. 3 is a view schematically illustrating a second substrate according to an embodiment of the present disclosure.
Figure 4:
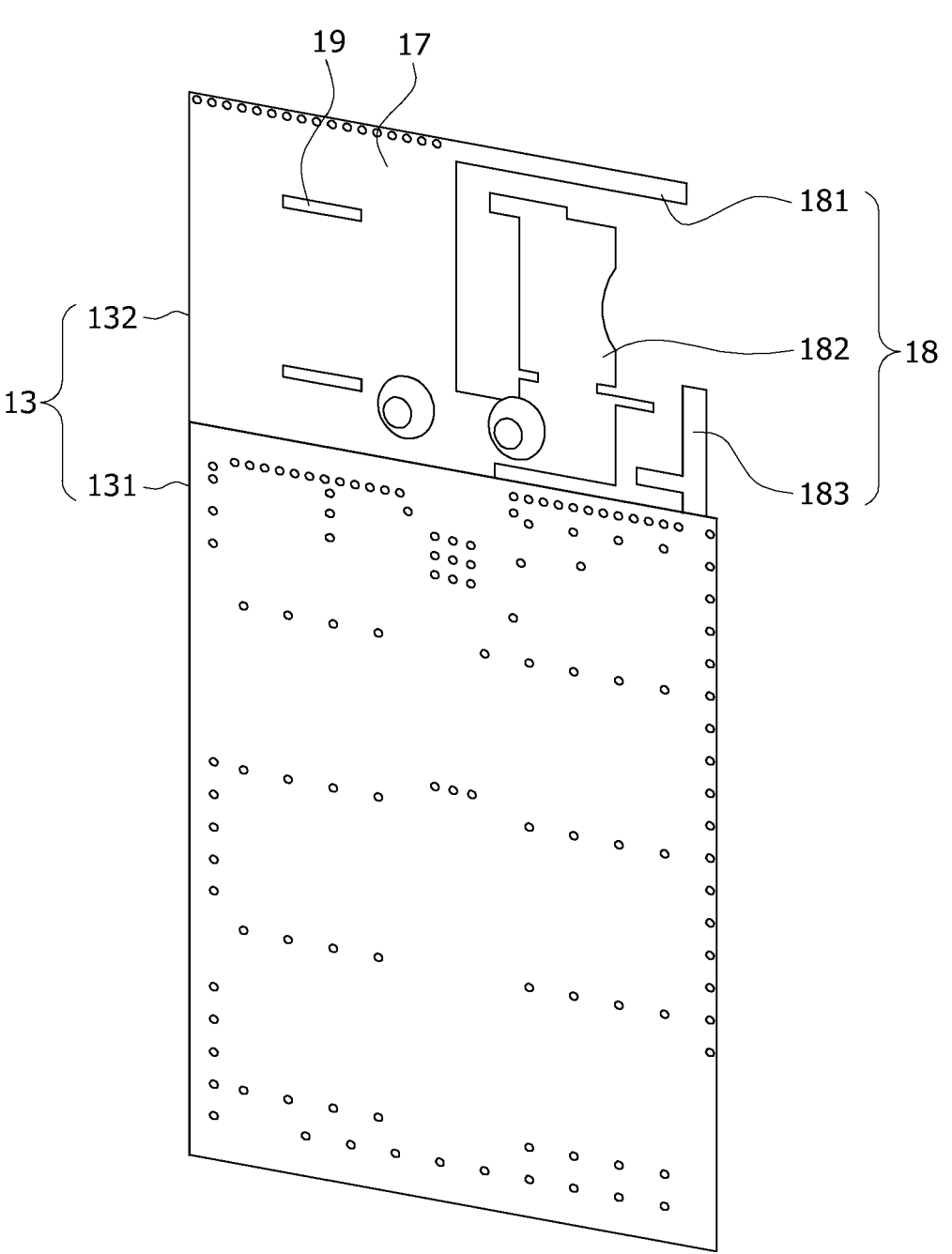
FIG. 4 is a view schematically illustrating a third substrate according to an embodiment of the present disclosure.
Figure 5:
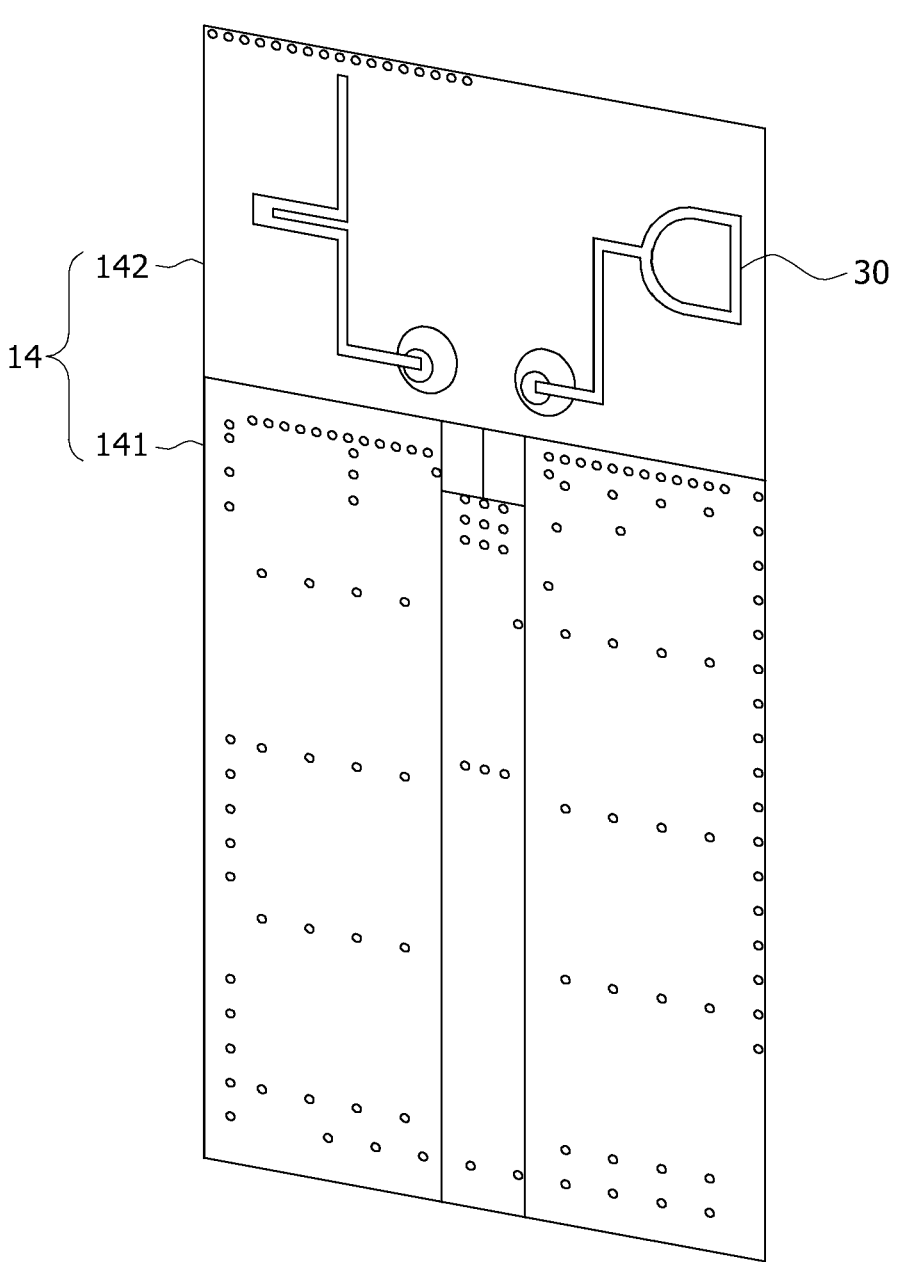
FIG. 5 is a view schematically illustrating a fourth substrate according to an embodiment of the present disclosure.

FIG. 2 is a view schematically illustrating a first substrate according to an embodiment of the present disclosure, FIG. 3 is a view schematically illustrating a second substrate according to an embodiment of the present disclosure, FIG. 4 is a view schematically illustrating a third substrate according to an embodiment of the present disclosure, and FIG. 5 is a view schematically illustrating a fourth substrate according to an embodiment of the present disclosure. Referring to FIGS. 2 to 5, the substrate 10 may include a first substrate 11, a second substrate 12, a third substrate 13, and a fourth substrate 14.

The directional radiation unit 20 may be formed on the first substrate 11. For example, the first substrate 11 may be divided into a first substrate circuit unit 111 where the circuit is formed and a first substrate antenna unit 112 where the directional radiation 20 is formed. The first substrate antenna unit 112 is connected to the first substrate circuit unit 111, and only half of the region of the substrate antenna unit 120 area is formed on the first substrate antenna unit 112, and the directional radiation unit 20 may be formed on the surface of the first substrate antenna unit 112. A dielectric material may be formed in a space excluding the first substrate antenna unit 112 in the region of the substrate antenna unit 120.

The second substrate 12 may be disposed under the first substrate 11 and may form a space. For example, the second substrate 12 may be stacked on top of the first substrate circuit unit 111, and a space may be formed in the region of the substrate antenna unit 120. The dielectric material may be formed in such a space.

The third substrate 13 may be disposed under the second substrate 12 and may form a grounding surface. For example, the third substrate 13 may include a third substrate circuit unit 131 stacked on top of the second substrate 12, and a third substrate antenna unit 132 connected to the third substrate circuit unit 131 and serving as the grounding surface.

The fourth substrate 14 may be disposed under the third substrate 13, and the non-directional radiation unit 30 may be formed. For example, the fourth substrate 14 may include a fourth substrate circuit unit 141 stacked on top of the third substrate circuit unit 131, and a fourth substrate antenna unit 142 connected to the fourth substrate circuit unit 141 and on which the non-directional radiation unit 30 is formed. The fourth substrate antenna unit 142 may include a signal-transmitting material or may have a shape corresponding to the third substrate antenna unit 132.

The third the substrate 13 according to an embodiment of the present disclosure may form a grounding surface including a third plate directionality unit 17 and a third plate non-directionality unit 18. For example, the third plate directionality unit 17 and the third plate non-directionality unit 18 may be included in the third substrate antenna unit 132.

The third plate directionality unit 17 is disposed to face the directional radiation unit 20, and a third signal hole 19 may be formed to provide a signal to the directional radiation unit 20. For example, the third plate directionality unit 17 extends from an upper left of the third substrate circuit unit 131 and has a shape corresponding to the first substrate antenna unit 112, a pair of third signal holes 19 are disposed in each of the pair of directional radiation units 20 to be spaced apart from each other for wireless signal transmission and may be formed in a manner that extends over a distance in the leftward-rightward direction.

The third plate non-directionality unit 18 is connected to the third plate directionality unit 17 and may induce an omni-directional radiation of the non-directional radiation unit 30. For example, the third plate non-directionality unit 18 may include a first ground unit 181 extending laterally from an upper end of the third plate directionality unit 17, a second ground unit 182 protruding laterally and extending upward from a lower end of the third plate directionality unit 17, and a third ground unit 183 protruding upward from an upper right end of the third substrate circuit unit 131.

Figure 6:
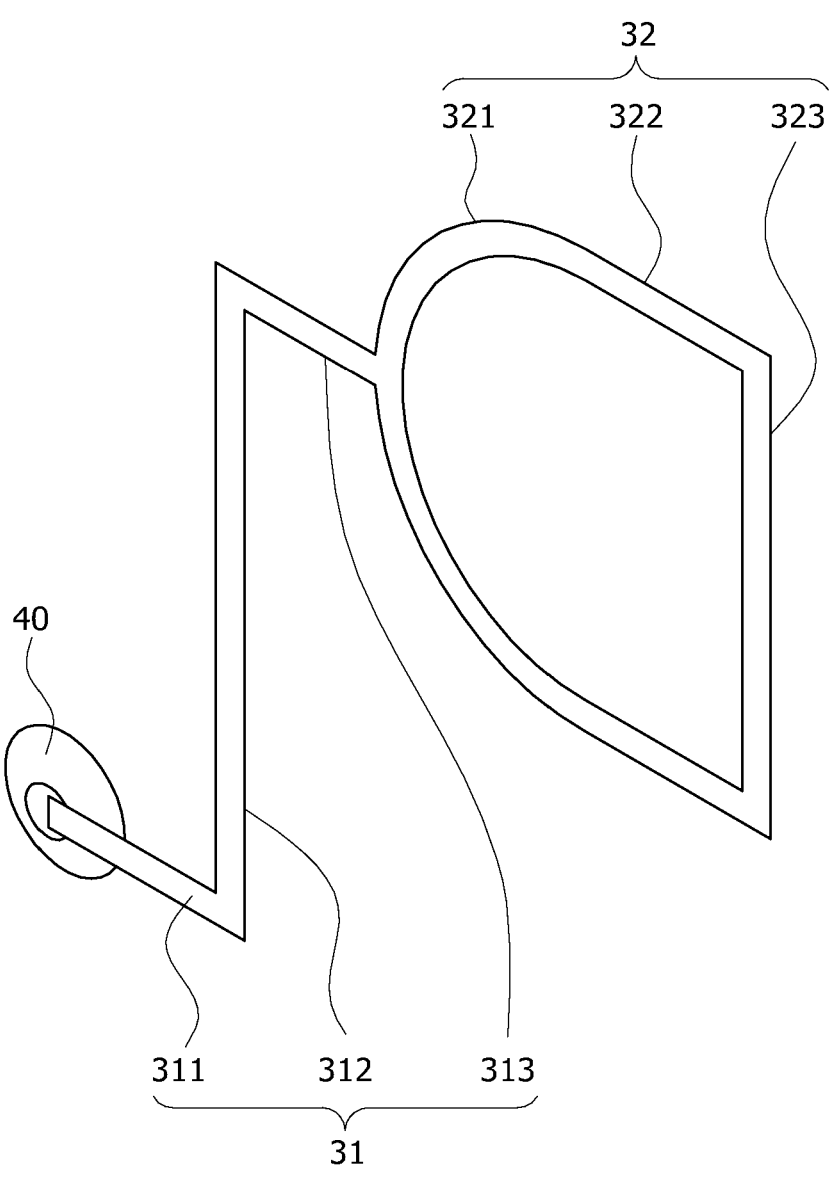
FIG. 6 is a view schematically illustrating a non-directional radiation unit according to an embodiment of the present disclosure.

FIG. 6 is a view schematically illustrating a non-directional radiation unit according to an embodiment of the present disclosure. Referring to FIG. 6, the non-directional radiation unit 30 according to an embodiment of the present disclosure may include a radiation feeding unit 31 and a radiation antenna unit 32.

The radiation feeding unit 31 is formed in the fourth substrate 14 and is connected to the signal providing unit 40. For example, the radiation feeding unit 31 may include a first feeding portion 311 connected to the signal providing unit 40, a second feeding portion 312 extending upward from the first feeding portion 311, and a third feeding portion 313 extending in the rightward direction from an upper end of the second feeding portion 312. The radiation feeding unit 31 may be disposed to face the second ground unit 182.

The radiation antenna unit 32 is connected to the radiation feeding unit 31, and when power is applied, the omni-directional radiation is possible. For example, the radiation antenna unit 32 may be disposed between the second ground unit 182 and the third ground unit 183.

More specifically, the radiation antenna unit 32 may include a radial curved portion 321, a radial extension portion 322, and a radial connection portion 323.

The radial curved portion 321 may be connected to the radiation feeding unit 31 and may have a curved surface. For example, the radial curved surface portion 321 may have a shape bent in both directions from a central portion of the radiation antenna unit 32, and the central portion of the radiation antenna 32 may be connected to the third feeding portion 313.

The radial extension portion 322 may extend from an end portion of the radial curved surface portion 321. For example, the radial extension portion 322 may extend from both ends of the radial curved portion 321 in the rightward direction of the substrate 10. The radial extension portion 322 may be disposed in such a manner as to face each other to be vertically symmetrical.

The radial connection portion 323 may connect the radial extension portion 322. For example, the radial connection portion 323 may connect the end of the radial extension portion 322.

FIG. 7 is a view schematically illustrating a signal providing unit according to an embodiment of the present disclosure. Referring to FIG. 7, the signal providing unit 40 according to an embodiment of the present disclosure may include a directional signal providing unit 41 and a non-directional signal providing unit 42.

The directional signal providing unit 41 is formed on the substrate 10 and may provide a wireless signal to the directional radiation unit 20. For example, the directional signal providing unit 41 generates a wireless signal on the rear surface of the substrate 10, and a signal generated by the directional signal providing unit 41 may operate the directional radiation unit 20 passing through the third signal hole 19.

The non-directional signal providing unit 42 is formed on the substrate 10 and may be connected to the non-directional radiation unit 30. For example, one end of the non-directional signal providing unit 42 may be connected to the substrate circuit unit 110, embedded in the substrate antenna unit 120, and the other end thereof may be connected to a first power supply unit 311.

The directional signal providing unit 41 according to an embodiment of the present disclosure may include a first directional signal unit 411 and a second directional signal unit 412.

The first directional signal unit 411 may be formed on the substrate 10. For example, one end of the first directional signal unit 411 may be connected to the substrate circuit unit 110, embedded in the substrate antenna unit 120, and the other end thereof may be connected to the second directional signal unit 412.

The second directional signal unit 412 is connected to the first directional signal unit 411, is disposed to face the directional radiation unit 20, and may provide an operation signal of the directional radiation unit 20 as power is applied. For example, the second directional signal unit 412 is formed on the rear surface of the substrate 10. The second directional signal unit 412 may include a first signal portion 451 connected to the first directional signal unit 411, a second signal portion 452, which extends from the first signal portion 451, has a length in an upward-downward direction, and facing the directional radiation unit 20 which is disposed below, a third signal portion 453 disposed to an upper of the second signal portion 452 and facing the directional radiation unit 20 disposed above, and a fourth signal portion 454 connecting the second signal portion 452 and the third signal portion 453.

An operation of a switching antenna for vehicular UWB communication 1 with the above structure is described as follows.

The directional radiation unit 20 is formed on the upper surface of the substrate 10, the non-directional radiation unit 30 is formed on the lower surface of the substrate 10, and the directional radiation unit 20 and the non-directional radiation unit 30 may be connected to the signal providing unit 40, respectively.

When detecting an occupant sitting on a rear seat is required in the above state, the signal providing unit 40 may wirelessly provide a signal to the directional radiation unit 20. Accordingly, when the directional radiation unit 20 is operated and then a directional radiation signal is emitted, it is possible to detect whether an occupant sitting on a rear seat is on board.

Meanwhile, in a case where location positioning is necessary, the signal providing unit 40 may block power authorization to the directional radiation unit 20 and apply power to the non-directional radiation unit 30. For this reason, the location positioning may be possible when the non-directional radiation unit 30 is operated and the non-directional radiation signal is emitted.

In the switching antenna for vehicular UWB communication 1 according to an embodiment of the present disclosure, the directional radiation unit 20 is formed on the upper surface of the substrate 10, the non-directional radiation unit 30 is formed on the rear surface of the substrate 10, and the directional radiation unit 20 may provide the directional radiation signal by the signal providing unit 40 or the non-directional radiation unit 30 may provide the non-directional radiation signal.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A switching antenna for vehicular Ultra-Wideband (UWB) communication, comprising:
   a substrate;
   a directional radiation unit formed on the substrate and configured to provide a directional radiation signal;
   a non-directional radiation unit formed on the substrate and configured to provide a non-directional radiation signal; and
   a signal providing unit formed on the substrate and configured to provide an on or off signal to either the directional radiation unit or the non-directional radiation unit, wherein the substrate comprises:
   a first substrate on which the directional radiation unit is disposed;
   a second substrate disposed under the first substrate and forming a space;
   a third substrate configured to provide a grounding surface for the second substrate; and
   a fourth substrate disposed under the third substrate and on which the non-directional radiation unit is disposed.

2. The switching antenna of claim 1, wherein the substrate comprises:
   a substrate circuit unit into which a circuit is built; and
   a substrate antenna unit in which the directional radiation unit, the non-directional radiation unit, and the signal providing unit are disposed.

3. The switching antenna of claim 2, wherein the directional radiation unit is disposed on an upper surface of the substrate antenna unit.

4. The switching antenna of claim 3, wherein the directional radiation unit is formed as a pair of directional radiation units, at least one directional radiation unit of the pair of directional radiation units has a shape of a rectangle, and the pair of directional radiation units are disposed in an upward-downward direction.

5. The switching antenna of claim 2, wherein the non-directional radiation unit is disposed on the bottom surface of the substrate antenna unit.

6. The switching antenna of claim 2, wherein the directional radiation unit is disposed to the left side of the substrate antenna unit, and
   the non-directional radiation unit is disposed to a right side of the substrate antenna unit to prevent signal interference with each other.

7. The switching antenna of claim 2, wherein the signal providing unit is embedded in the substrate antenna unit and is connected to the substrate circuit unit to supply electric power.

8. The switching antenna of claim 1, wherein the first substrate comprises:
   a first substrate circuit unit on which a circuit is disposed; and
   a first substrate antenna unit connected to the first substrate circuit unit and on which the directional radiation unit is disposed.

9. The switching antenna of claim 1, wherein the third substrate comprises:
   a third substrate circuit unit stacked on a top of the second substrate; and
   a third substrate antenna unit connected to the third substrate circuit unit and serving as the grounding surface.

10. The switching antenna of claim 9, wherein the third substrate antenna unit comprises:

a third plate directionality unit, which is disposed to face the directional radiation unit and forms a third signal hole for providing a signal to the directional radiation unit; and a third plate non-directionality unit, which is connected to the third plate directionality unit and induces omni-directional radiation of the non-directional radiation unit.

11. The switching antenna of claim 10, wherein a pair of third signal holes is formed in a manner that extends over a distance in leftward and rightward directions and the pair of third signal hole is disposed to be vertically spaced apart from each other for signal transmission in the pair of directional radiation units.

12. The switching antenna of claim 10, wherein the third plate non-directionality unit comprises:

a first ground unit extending laterally from an upper end of the third plate directionality unit;

a second ground unit protruding laterally from a lower end of the third plate directionality unit and extending upward; and a third ground unit protruding upward from an upper right end of the third substrate circuit unit.

13. The switching antenna of claim 1, wherein the non-directional radiation unit comprises:

a radiation feeding unit formed on the fourth substrate and connected to the signal providing unit; and a radiation antenna unit connected to the radiation feeding unit and capable of omni-directional radiation when power is applied.

14. The switching antenna of claim 13, wherein the radiation feeding unit comprises:

a first feeding unit connected to the signal providing unit;

a second feeding unit extending upward from the first feeding unit; and a third feeding unit extending from an upper end of the second feeding unit in a rightward direction.

15. The switching antenna of claim 13, wherein the radiation antenna unit comprises:

a radial curved portion connected to the radiation feeding unit and forming a curved surface;

a radial extension portion extending from an end of the radial curved portion; and a radial connection portion connecting the radial extension portion.

16. The switching antenna of claim 15, wherein a central portion of the radial curved portion is connected to the radiation feeding unit.

17. The switching antenna of claim 1, wherein the signal providing unit comprises:

a directional signal providing unit formed on the substrate and configured to provide a wireless signal to the directional radiation unit; and a non-directional signal providing unit formed on the substrate and connected to the non-directional radiation unit.

18. The switching antenna of claim 17, wherein the directional signal providing unit comprises:

a first directional signal unit formed on the substrate; and a second directional signal unit connected to the first directional signal unit, disposed to face the directional radiation unit, and providing an operation signal of the directional radiation unit as power is applied.

19. The switching antenna of claim 18, wherein the second directional signal unit comprises:

a first signal unit connected to the first directional signal unit;

a second signal unit extending from the first signal unit;

a third signal unit disposed above the second signal unit; and a fourth signal unit connecting the second signal unit and the third signal unit, and wherein the second signal unit and the third signal unit are disposed to face the directional radiation unit which is formed as a pair of directional radiation units, respectively.

* * * * *